Patented Jan. 4, 1938

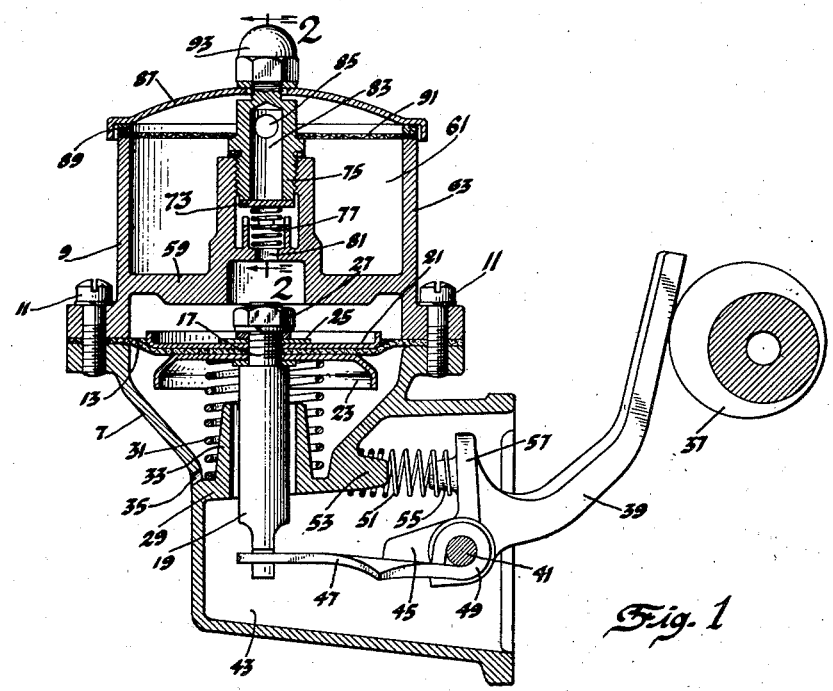
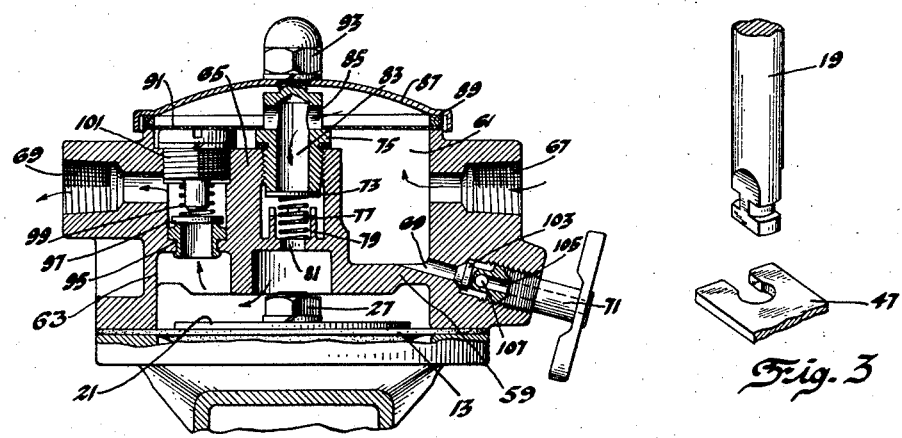

2,104,446

UNITED STATES PATENT OFFICE 2,104,446

FUEL PUMP

Abraham M. Babitch and Gordon W. Harry, Flint, Mich., assignors to General Motors Corporation, Detroit, Mich., a corporation of Delaware Application November 30, 1931, Serial No. 577,922

3 Claims. (Cl. 103—150)

This invention relates to pumps and has been designed as an improved pump for supplying fuel to an internal combustion engine.

An object of the invention is to simplify the construction of a combined pump and fuel filter.

As a further object the invention aims to prevent overheating and vaporization of fuel in the pump chamber.

Other objects and advantages, such as compactness and economy in manufacture will be understood from the following description.

In the drawings accompanying this description Fig. 1 is a view in vertical section through the pump.

Fig. 2 is a sectional view on line 2—2 of Fig. 1.

Fig. 3 is a view in perspective of the jointed operating parts.

Figure 4:
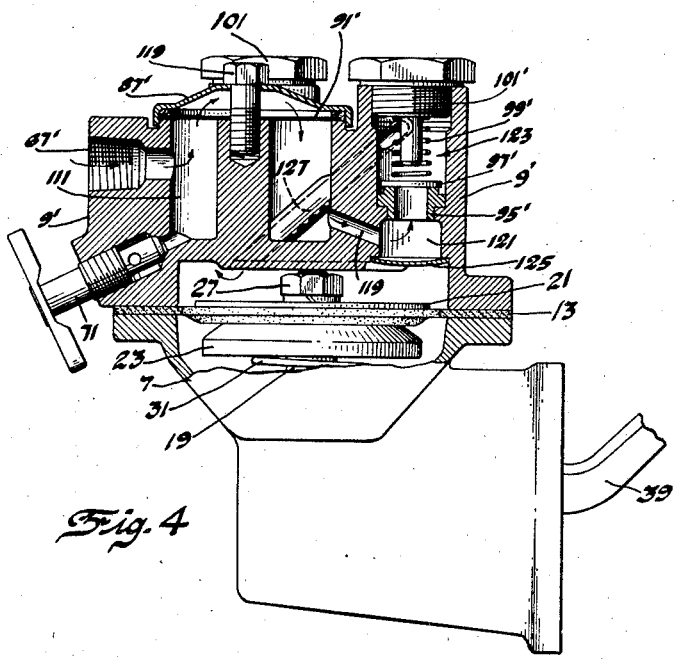
Fig. 4 is a view partly in elevation and partly in section, the section being substantially on line 4—4 of Fig. 5, this view representing a modified form.

Referring by reference characters to the drawings, numeral 7 on Fig. 1 designates a body member of the pump and 9 is a cover member, the parts being secured together by fastening means 11. A flexible diaphragm 13, impervious to gasoline, is clamped between the body and cover. The cover is recessed on its lower side and, together with the diaphragm, forms the pump chamber. Vibratory movements of the diaphragm are used to vary the capacity of the pump chamber and make the suction and discharge strokes.

The apertured center of the diaphragm is located upon a reduced part 17 of a reciprocating rod or stem 19. On opposite sides of the diaphragm and also mounted on part 17 are discs 21 and 23. This assembly, together with suitable washers 25, is held firmly on the stem 19 by a nut 27.

The body of the pump is formed with a partition 29 above which is a space for a spring 31 operating against the disc 23 to press the diaphragm upwardly, reduce the capacity of the pump chamber and thus make a discharge stroke. The rod or stem 19 is reciprocable with a suitable clearance through a tubular part 33. Part 33 functions as a dam to prevent any gasoline from passing through the clearance space around the stem 19 in the event of leakage through a defective diaphragm. The clearance space (stem 19 is not guided by the opening through the wall 33) prevents the sticking of the stem as a result of freezing of water vapor, which might occur in cold weather and interfere with the action of the pump. Preferably also a breather hole 35 is provided for the escape of any fuel collecting around the dam.

The discharge stroke of the pump is made by the spring 31 as stated above. The suction stroke is made positively (not resiliently) by means of mechanical parts associated with the diaphragm and moved by a cam on the engine camshaft. At 37 is shown the cam. It rocks lever 39 in a counter-clockwise direction upon a fulcrum pin 41 carried by the body 7. The pin 41 is located in a chamber or cavity 43 beneath the partition 29 which chamber is open and covers an opening in the engine crankcase, not shown, this being the usual construction with fuel pumps. The lever 39 has an arm 45 beyond its pivot 41 for engaging a link or lever extension 47, the link 47 having an eye 49 rotatably supported on pin 41. When the arm 45 engages link 47, link 47 and lever 39 rotate as a unit about the pivot 41 under the pressure of the cam. The end of link 47 and rod 19 are shaped to form an interlocking connection as shown in Fig. 3. This connection facilitates assembly and permits of a considerable range of relative rotation of the parts without endangering separation.

It will now be seen that the simultaneous counter-clockwise movement of lever 39 and link 47 under the influence of the cam pulls down upon the diaphragm, enlarges the capacity of the pump chamber, and thereby makes a suction stroke. It will be observed, however, that the extent of the discharge stroke is variable, being dependent upon the developed pressure of the pump chamber. When the demand for fuel is less than the maximum capable of being delivered by the pump, the built-up pressure in the pump chamber balances the pressure of spring 31 and the diaphragm is not raised to its uppermost position. Under this condition arm 45 separates from link 47 and a subsequent suction stroke begins only when these parts again contact. It will therefore be seen that this is a variable stroke pump, the variation depending upon the built-up pressure in the pump chamber. For the purpose of holding the lever 39 against the cam during partial pump strokes and thereby prevent noise between the cam and the lever, spring 51 is seated about a boss 53 on the pump body 7 and also about a boss 55 on an arm 57 of lever 39.

The cover 9 has a partition 59 to form the recess, the partition 59 and the diaphragm constituting the pump chamber as stated above. Above the partition is a space 61 formed by the outer circular wall 63 and a substantially radial wall 65. An inlet passage 67 through the wall 63 and an outlet passage 69 also through the wall 63 are provided. Inlet passage 67 is for connection with the conduit from a fuel reservoir and opens into space 61. Outlet passage 69 is for connection with a conduit leading to the carburetor and it is in communication with an outlet valve (to be described) leading from the pump chamber and located in the wall 65. Substantially centrally of the cover and in the radial wall 65 is an inlet valve (to be described) affording communication between the pump chamber and the upper part of chamber 61. Leading from the bottom of chamber 61 and also in the wall of the chamber is a drain passage 69 closed by a manually operable valve 71.

The inlet valve is constituted by a disc 73 seated against the lower end of a plug 75 threaded into an opening in the radial wall and located at the center of the cover 9. The disc 73 is held against its seat by a spring 77 located within an inner circular wall 79. A central opening 81 communicates with the pump chamber. A longitudinal passage 83 and radial passages 85 afford communication with the upper part of chamber 61. A closure member 87 with a gasket 89 is clamped over the open top of cover 9. A screen 91 is secured peripherally in position between the cover and closure. To secure the parts in position a plug 75 is provided with a reduced end threaded to receive a nut 93 which engages the outer surface of the closure and clamps the closure in position when threaded upon the end of plug 75.

For the outlet valve a valve seat 95 is located in an opening in the radial wall. A valve disc 97 is held upon its seat by gravity and by a spring 99, the upper end of which is in abutment with a plug 101 threaded into an opening in the radial wall. The drain plug 71 has a reduced end terminating in a valve 103. The valve seats as shown to close passage 69. It has an axial passage 105 extending throughout its length and a radial passage 107 affording communication between the axial passage 105 and the reduced end, so that when the plug is turned to move the valve 103 from its seat liquid within the chamber 61 may escape into the reduced end and through passages 107 and 105. By this arrangement water and other foreign matter may be removed from chamber 61.

The operation will be understood from the above description. The fuel from the reservoir enters at 67 and is filtered by the filtering screen 91 as it passes from the lower portion of chamber 61 to that part above the filter. It then passes through openings 85 and 83 to the inlet valve. It then enters the pump chamber through passage 81. From the pump chamber it is forced through the outlet valve 97 to the pump discharge opening 69.

This construction has certain advantages over prior pumps. In this present pump the novel cover structure not only provides for carrying the valves but includes the chamber for the collection of water and sediment, thereby avoiding the need of a separate filtration unit. It maintains a body of liquid fuel directly over the pump chamber, separated therefrom merely by a wall or partition 59. As a result the heat which might tend to vaporize fuel in the pump chamber is in a large measure conducted to the liquid fuel in chamber 61. Vaporization in the pump chamber is therefore avoided.

Figure 5:
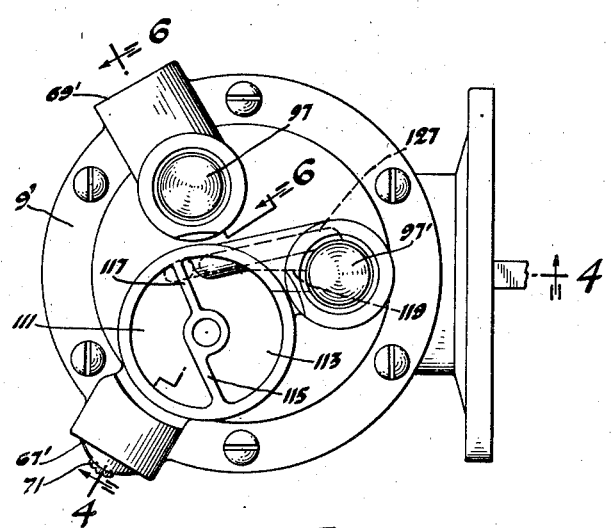
Fig. 5 is a top plan view of the modification shown in Fig. 4 with parts removed.
Figure 6:
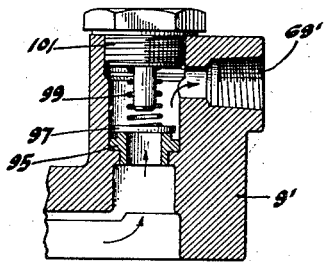
Fig. 6 is a section on line 6—6 of Fig. 5.

Figs. 4, 5, and 6 show a modification embodying the same essential features. This modification has been designed so that the discs of both inlet and outlet valves seat by gravity as well as under the influence of their springs, differing in this respect from the former embodiment wherein the inlet valve was held to its seat by a spring against the action of gravity. Another difference is concerned with the accessibility of the valve mechanism which, in this case, is reached by removing plugs but without removing the equivalent of the closure member 87 in the form already described.

In this second form the body member 7 together with the operating mechanism may be the same as that shown in Fig. 1.

The cover 9' is provided with two segmental chambers 111 and 113 divided by radial walls 115 and 117. The filtering screen 91' and the closure 87' are held by fastening means 119 threaded into the central point of union of the walls 115 and 117. The inlet passage 67' leads to the chamber 111 from which water and foreign matter may be drained by the same sort of drain plug 71 which has been described.

The fuel passes through the filter member 91' into the chamber 113 and from the chamber 113 it passes by way of a passage 119 to a space 121 beneath the inlet valve 123. This valve is formed by a seat 95' (corresponding to seat 95 of Fig. 2), a valve disc 97', and a spring 99' seated against a threaded plug 101' accessible from the outside of the pump. It has been found desirable in forming the opening for the inlet valve seat to extend the passage 121 into the pump chamber and to thereafter close the opening with a plug as at 125. This process of manufacture has been adopted to aid in assembling the valve seat 95' and to facilitate the securing of this seat to the cover. The cover 9' is formed with a passage 127 leading from a point above the inlet valve to the pump chamber as shown in Fig. 4. The pump chamber communicates with the pump outlet at 69' by an outlet valve as shown in Fig. 6. This valve differs in no essential respects from the valve shown in Fig. 2, and the same reference characters are used to represent the several parts. This form of the invention is much like the other, differing in that it provides for convenient accessibility to the valves and in that it employs valves both of which seat by gravity as well as under the influence of their springs.

The operation of both forms of the invention is the same. The fuel in each case enters a chamber which may be called the sediment chamber and from which foreign matter may be removed by the manually adjustable valve. The fuel is then filtered and passed through the inlet valve to the pump chamber, and from the pump chamber it is discharged through an outlet valve to its destination. In each form the suction stroke is mechanically operated and positive. In each form the discharge stroke is made by a yielding spring to accommodate varying demands. In each case a body of fuel overlies the pump chamber, serving to prevent fuel vaporization within the pump chamber.

We claim:

1. In a fuel pump, a pump body, a cover, a diaphragm therebetween, said cover having a partition forming, together with the diaphragm, a pump chamber, means in said pump body and operatively connected with the diaphragm to move the same and thereby operate the pump, said cover having a fuel-receiving chamber, a filter screen dividing said fuel-receiving chamber into first and second parts, said cover having a first valve affording a yielding inlet for the flow of fuel from the second chamber to the pump chamber and said cover having a second valve affording a yielding outlet from the pump chamber, said inlet valve comprising a movable valve disc, a plug extending axially into said cover and secured thereto and having at its end a seat for said valve disc, a closure for said fuel-receiving chamber, fastening means engaging said closure and adjustable on said plug to maintain said closure in position.

2. In a fuel pump, a pump body, a cover, a diaphragm therebetween, said cover having a partition forming, together with the diaphragm, a pump chamber, means in said pump body and operatively connected with the diaphragm to move the same and thereby operate the pump, said cover having a fuel-receiving chamber, a filter screen dividing said fuel-receiving chamber into first and second parts, said cover having a first valve affording a yielding inlet for the flow of fuel from the second chamber to the pump chamber and said cover having a second valve affording a yielding outlet from the pump chamber, said inlet valve comprising a movable valve disc, a plug extending axially into said cover and secured thereto and having at its end a seat for said valve disc, a closure for said fuel-receiving chamber, fastening means engaging said closure and adjustable on said plug to maintain said closure in position, said plug having therein a passage from the second part of the fuel-receiving chamber and communicating with the inlet valve.

3. In a fuel pump, a pump body, a cover, a diaphragm therebetween, said cover having a partition forming, together with the diaphragm, a pump chamber, means in said pump body and operatively connected with the diaphragm to move the same and thereby operate the pump, said cover having a fuel-receiving chamber, a filter screen dividing said fuel-receiving screen into first and second parts, said cover having a first valve affording a yielding inlet for the flow of fuel from the second part of the fuel-receiving chamber to the pump chamber and said cover having a second valve affording a yielding outlet from the pump chamber, a plug extending axially into said cover, secured thereto and having an axial passage communicating with the pump chamber, one of said valves controlling said passage, a closure for said fuel-receiving chamber, and means associated with said plug to secure said closure in position.

ABRAHAM M. BABITCH.
GORDON W. HARRY.